United States Patent [19]

Iwaoka et al.

[11] 4,020,505
[45] Apr. 26, 1977

[54] MAGNETIC SHEET PLAYER WITH AN ADJUSTABLE INCLINED MAGNETIC HEAD

[75] Inventors: Masao Iwaoka; Yosuke Igeta; Toyochika Kiku; Fumio Kobayashi; Tatsuhiko Sugai, all of Tokyo, Japan

[73] Assignee: Gakken Co. Ltd., Tokyo, Japan

[22] Filed: Oct. 20, 1975

[21] Appl. No.: 624,128

[30] Foreign Application Priority Data

| Nov. 26, 1974 | Japan | 49-142333 |
| Dec. 11, 1974 | Japan | 49-149199 |
| Feb. 22, 1975 | Japan | 50-24817 |
| Feb. 25, 1975 | Japan | 50-25679 |
| Feb. 27, 1975 | Japan | 50-26746 |

[52] U.S. Cl. ............................ 360/101; 360/107
[51] Int. Cl.[2] ................ G11B 21/02; G11B 21/18
[58] Field of Search ............ 360/2, 101, 107, 130, 360/137

[56] References Cited

UNITED STATES PATENTS

| 3,214,175 | 10/1965 | Nakamatsu | 360/101 |
| 3,596,914 | 8/1971 | Fujimoto | 360/107 |
| 3,682,482 | 8/1972 | Holmes | 360/107 |
| 3,896,491 | 7/1975 | Soemring et al. | 360/107 |

Primary Examiner—Robert S. Tupper
Attorney, Agent, or Firm—Irving M. Weiner; Pamela S. Austin

[57] ABSTRACT

A teaching machine on which is replaceably mounted a rectangular sheet of paper or the like with a spiral magnetic track on one surface, which is directed downwardly, and with printed material on the other surface for visual presentation of the subject of audio information prerecorded on the track. A movable magnetic head under the sheet follows its track for playback or recording. To afford closer contact between head and sheet and hence to improve the playback quality, a hinged holder frame secures the sheet to the machine casing at its marginal edges only, and the head is spring biased into abutting contact with the yieldably supported sheet. The head itself is supported out of the perpendicular to the plane of the sheet so as to remain in intimate contact therewith throughout its travel along the complete track on the sheet.

14 Claims, 14 Drawing Figures

FIG. 12
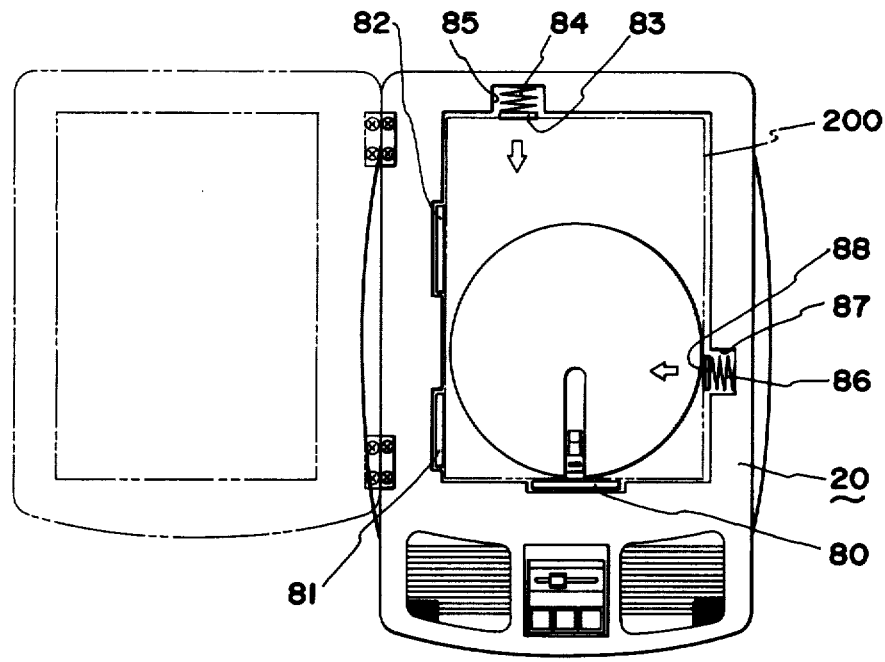
FIG. 13
FIG. 14
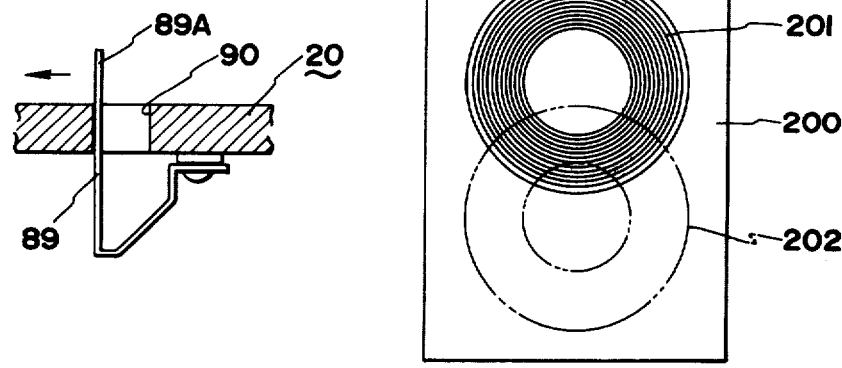

MAGNETIC SHEET PLAYER WITH AN ADJUSTABLE INCLINED MAGNETIC HEAD

BACKGROUND OF THE INVENTION

This invention relates generally to magnetic sheet apparatus and to teaching apparatus. More specifically the invention is directed to improvements in a magnetic sheet player, with or without provisions for recording, in which the recording medium takes the form of what is herein termed a magnetic sheet, that is, a rectangular sheet of paper or other material with a spiral magnetic track on one surface and with characters, pictures, tables or the like printed on the other surface by way of visual presentation of the subject of audio information prerecorded on the track. The machine of this character is employed extensively for audiovisual teaching purposes, although it is adaptable for other applications as well within the scope of this invention.

In magnetic sheet players under consideration the magnetic sheet to be played back or recorded on is stationarily mounted in position on the machine, with its track-bearing surface directed downwardly, and a movable magnetic head under the sheet follows its spiral track by travelling along a radial guide slot in a turntable in step with its rotation. Heretofore the magnetic sheet has usually been secured to the machine by means of a rigid cover plate that covers the entire surface of the sheet under pressure, with the magnetic head resiliently urged into abutting contact with the sheet.

The use of the rigid cover plate according to the prior art is objectionable because it prevents the magnetic sheet from making as intimate contact with the magnetic head as, for example, the usual magnetic tape in a magnetic recorder or reproducer. The conventional cover plate is also insufficient for holding the magnetic sheet in position against any possibility of displacement, with its track in precise registration with the air gap in the magnetic head.

Another disadvantage with the prior art arises from the upright disposition of the magnetic head with respect to the horizontally supported magnetic sheet. As the magnetic head travels along the spiral track on the magnetic sheet, it encounters substantial frictional resistance which can cause the head to incline in the direction away from its direction of travel, thereby impairing the desired neat contact with the sheet.

The poor or improper contact of the magnetic head with the magnetic sheet can deteriorate the playback quality to such an extent that the machine is only capable of reproducing speech with a tolerable degree of fidelity but is quite inadequate for reproduction of music or the like of listenable quality. The machine with such inferior playback quality if unsuitable for language study, either, where the exact pronunciation, accentuation and intonation of the speaker must be reproduced. Proper contact between head and sheet is a prerequisite for sound reproduction over as wide a range of frequencies as is possible with the machine.

SUMMARY OF THE INVENTION

It is a primary object of this invention to provide some improvements designed to enhance the value and utility of a magnetic sheet player of the character in question, such that the listed disadvantages of the prior art are thoroughly overcome.

Another object of the invention is to achieve, in the machine of the type defined, closer contact between magnetic head and magnetic sheet throughout the course of travel of the former along the spiral track on the latter, thereby improving the playback quality of the machine and widening its playback frequency range to the maximum possible degree.

Another object of the invention is to provide means for securely holding the magnetic sheet in position over the machine against any possibility of displacement during playback or recording operation.

A further object of the invention is to provide means for automatically positioning the magnetic sheet exactly in a predetermined positioned over the machine in order that the spiral magnetic track on the sheet may be brought into precise registration with the magnetic head.

With these and other objects in view this invention provides, in a magnetic sheet player of the type defined, the improvement which comprises a rectangular holder frame for immovably securing the magnetic sheet onto the platform of the machine by engaging its marginal edges only, means for yieldably urging the magnetic head into abutting contact with the magnetic sheet on the platform, and means for holding the magnetic head out of the perpendicular to the plane of the magnetic sheet.

Since the magnetic sheet is secured only at its marginal edges by the holder frame, its major portion is yieldable to some extent to the pressure from the magnetic head, which is typically spring actuated into contact with the sheet from below. Thanks to this arrangement according to the invention the magnetic sheet makes substantially as intimate contact with the head as the conventional magnetic tape does with the reproducing or recording head.

The magnetic head is supported at an angle to the plane of the magnetic sheet to maintain the above intimate contact between head and sheet throughout the course of travel of the former along the spiral track on the latter. More specifically, the magnetic head is slightly inclined both in its predetermined forward direction of rotation relative to the magnetic sheet and in the radially outward direction of the spiral track on the sheet.

As previously set forth, the magnetic head experiences substantial frictional resistance as it travels along the track on the magnetic sheet in sliding contact therewith. It is to compensate for the consequent rearward inclination of the head that the same is slightly inclined in its forward direction of rotation according to the invention.

The radially outward inclination of the magnetic head is necessary because, since the magnetic sheet is engaged only at its marginal edges by the holder frame, it is significantly more easy to yield to the pressure from the magnetic head at its central portion than at its peripheral portion. The magnetic head inclined in the radially outward direction is capable of making neat contact with the magnetic sheet even when located at its outermost starting position. The close contact between head and sheet is maintained as the head travels toward the center of the spiral track, where the sheet is sufficiently flexible to adjust itself to the inclined attitude of the head.

The features which are believed to be novel and characteristic of this invention are set forth in particular in the appended claims. The invention itself, however, both as to its organization and manner of operation, together with the additional objects and advantages thereof, will become apparent in the course of the following description read in connection with the accompanying drawings in which like reference characters refer to like parts throughout the several views.

BRIEF DESCRIPTION OF THE DRAWINGS

FIG. 12 is a schematic top plan view showing means for positioning the magnetic sheet on the casing;

FIG. 13 is an enlarged, fragmentary vertical sectional view showing a modification of the positioning means of FIG. 12; and FIG. 14 is a plan view of the magnetic sheet for use with the machine of FIG. 1.

DESCRIPTION OF THE PREFERRED EMBODIMENT

Figure 1:
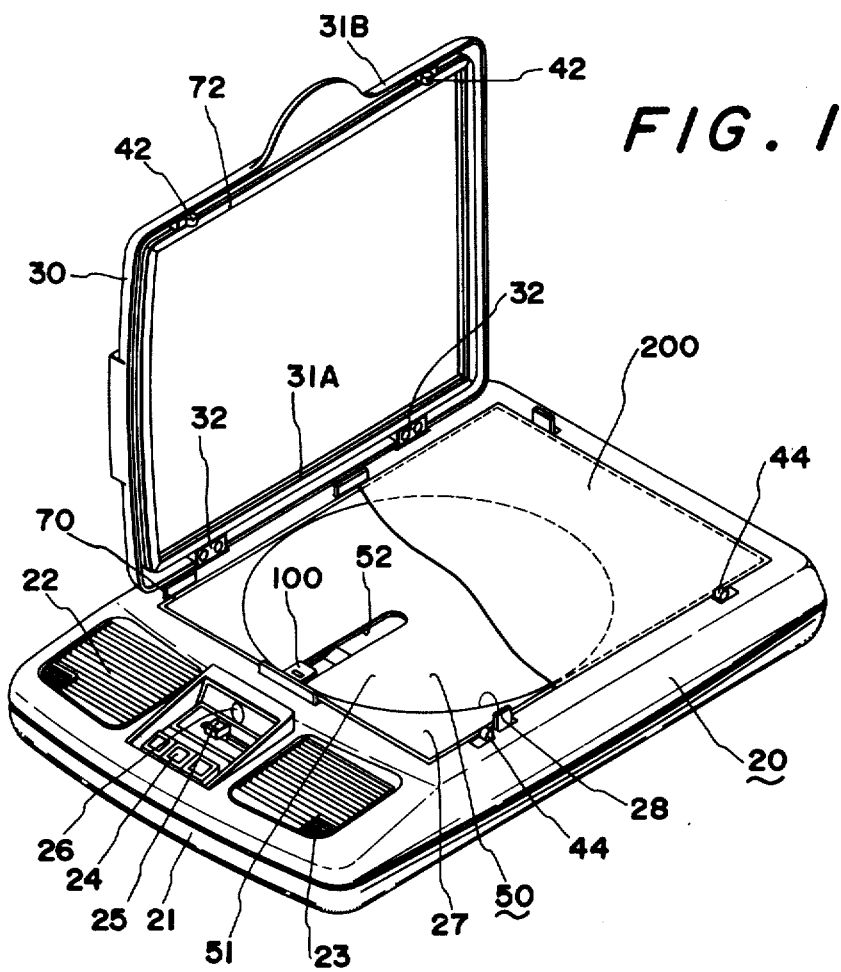
FIG. 1 is a perspective view of a magnetic sheet reproducing-recording machine incorporating the novel concepts of this invention, in which the magnetic sheet is shown partly broken away to reveal the parts of the machine lying thereunder.

With reference to FIG. 1 the magnetic sheet reproducing-recording machine illustrated therein by way of a preferred embodiment of this invention includes a casing 20 of generally flat, rectangular configuration. Adjacent the front end 21 of the casing 20 a loudspeaker jacket 22 and microphone jacket 23 are arranged with a spacing therebetween by way of protective coverings for the loudspeaker and microphone that are both built into the machine. Between the jackets 22 and 23 there are arranged a row of pushbutton switches 24 for the control of such machine operations as playback, stop and backspacing. A slide-rule-type volume control 25 and pilot lamp 26 are also arranged between the jackets 22 and 23.

Although not seeable in FIG. 1, three other switches are assumed to be provided to the casing 20. One is an on-off switch. Another is a recording switch to be actuated simultaneously with the playback switch to initiate recording operation. Still another is a playback-round mode selector switch to be actuated selectively to set the electric circuitry of the machine in the playback or recording mode.

The casing 20 includes a rectangular platform 27 which is elongated in the front-to-rear direction of the machine and on which a magnetic sheet is to be replaceably mounted. The platform 27 has a circular opening 28 which slightly deviates forwardly from the center of the platform. Rotatably fitted in the opening 28 is a turntable 50 having its top 51 flush with, or slightly below, the platform 27. The turntable 50 has a radial guide slot 52 into which a magnetic reproducing-recording head 100 intrudes from below for movement therealong.

Figure 3:
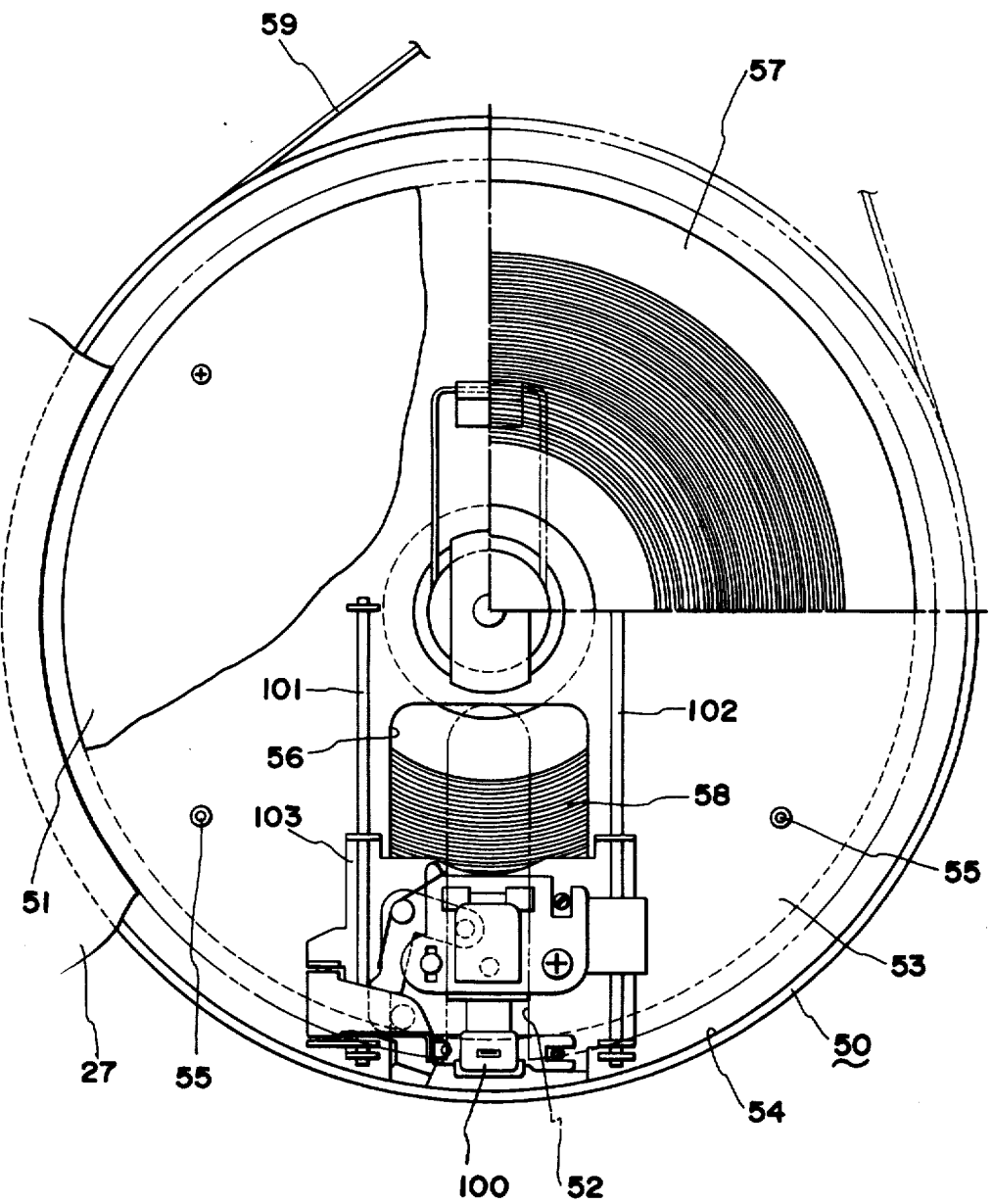
FIG. 3 is an enlarged top plan view of the turntable in the machine of FIG. 1, with the turntable shown dually broken away to reveal the means for moving the magnetic head along the spiral track on the magnetic sheet.

As best illustrated in FIG. 3, the turntable 50 includes a bottom 53 which has a raised rim 54 along its circumference and which is rotatably mounted on the bottom of the casing 20. The turntable bottom 53 has a plurality of, four in this embodiment, upstanding posts 55 having tapped holes therein for use in screwing the aforesaid top 51 to the rimmed bottom. A pair of parallel spaced guide rails 101 and 102 are fixedly mounted on the turntable bottom 53 so as to extend along the radial guide slot 52 that is formed in the removable top 51. The magnetic head 100 is slidably mounted on the guide rails 101 and 102 via a carriage 103 for movement along the radial guide slot 52.

Figure 8:
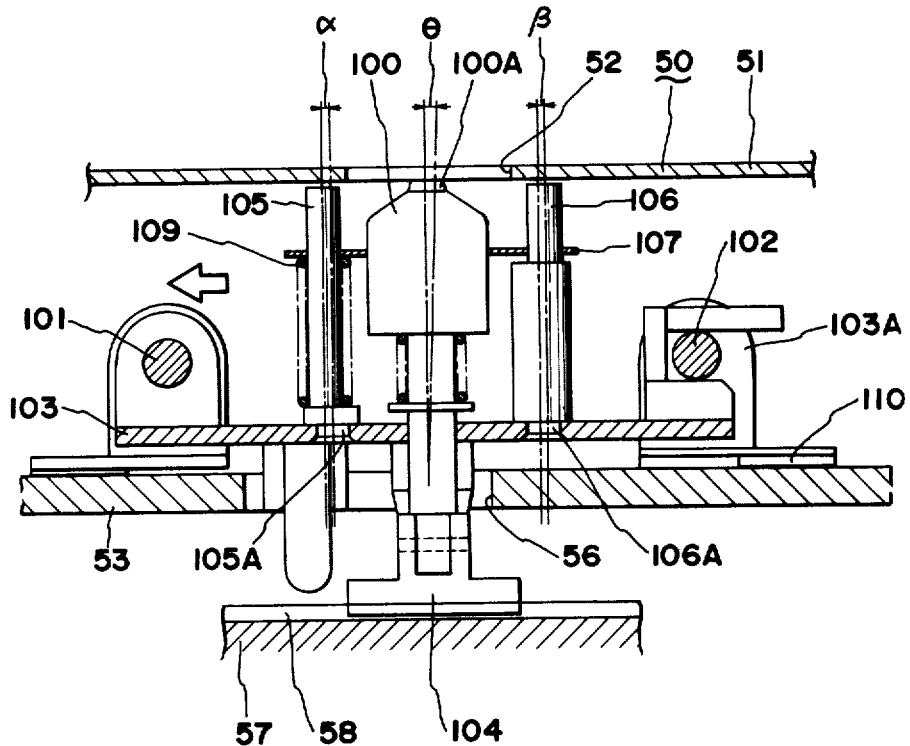
FIG. 8 is an enlarged, fragmentary vertical sectional view of the magnetic head and its resilient support means as seen in the radial direction of the turntable in which the head is mounted.
Figure 10:
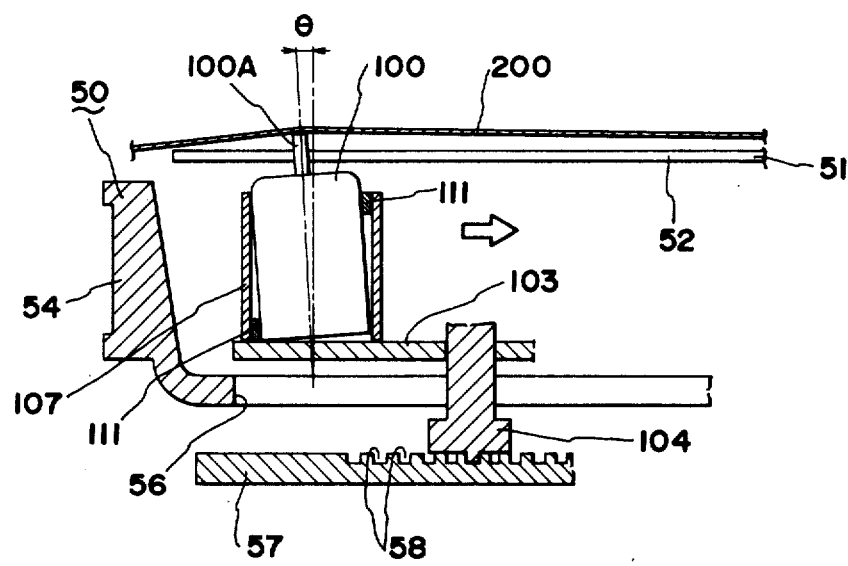
FIG. 10 is an enlarged, fragmentary vertical sectional view as seen in the radial direction of the turntable to illustrate the means for holding the magnetic head inclinded in the radially outward direction of the turntable.

With reference to FIGS. 3, 8 and 10 the turntable bottom 53 has a radial slot or aperture 56 extending along and located between the guide rails 101 and 102, the slot 56 being of greater width than the guide slot 52. A guide 104 mounted on the underside of the carriage 103 extends downwardly through the slot 56 and is slidably engaged in a spiral guide groove 58 formed on a stationary disc 57 as a replica of the spiral magnetic track on the magnetic sheet 200.

Thus, as rotation is imparted to the turntable 50 in its predetermined forward direction from a suitable drive mechanism, not shown, via an endless belt 59, the guide 104 will move along the spiral guide groove 58 to cause the carriage 103 and therefore the magnetic head 100 to travel along the guide rails 101 and 102 toward the center of the turntable from their outermost starting position best illustrated in FIGS. 1 and 3. Since the magnetic head 100 thus travels linearly along the radial guide slot 52 in step with the rotation of the turntable 50 relative to the platform 27, the magnetic head follows the spiral magnetic track on the magnetic sheet 200 supported in position over the platform by means described later.

As depicted in FIG. 14 the magnetic sheet 200 in its preferred form is a rectangular sheet of paper having one of its surfaces coated with magnetizable iron oxide particles to provide the spiral magnetic track 201. On the opposite surface of the sheet there are printed the characters, pictures, diagrams, tables, photographs, and other forms of visual information corresponding to the audio information prerecorded on the magnetic track 201. If desired, another spiral magnetic track 202 may be formed as in the drawing.

With this magnetic sheet placed and held in position over the platform 27, with its track-bearing surface directed downwardly, the student can play back the audio information therefrom and, where desired, record his own voice thereon to learn the subject matter on an audiovisual basis. The electric circuitry and associated means necessary for such playback and recording operations are not specifically disclosed because of their rather common and well known nature.

Figure 2:
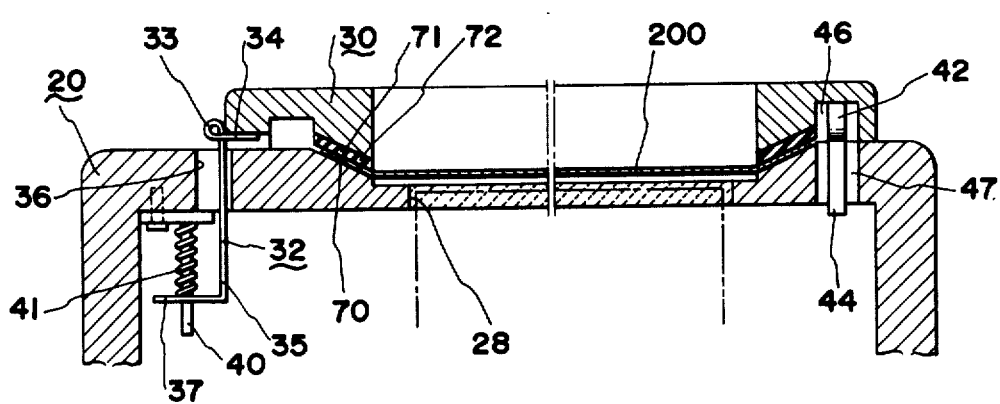
FIG. 2 is an enlarged, fragmentary vertical sectional view, partly broken away, of the machine of FIG. 1, the view being illustrative of the means including a holder frame for holding the magnetic sheet in position over the machine.

The following means are adopted according to this invention for securely holding the magnetic sheet in position over the platform 27. As seen in FIGS. 1 and 2, a rectangular holder frame 30 is hinged at 32 to the casing 20 on one side of the platform 27. The holder frame 30 is shaped and sized to fit over the marginal edges of the magnetic sheet on the platform.

Figure 4:
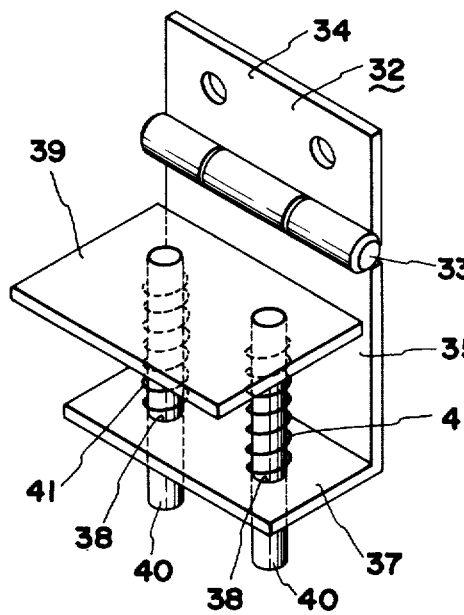
FIG. 4 is an enlarged perspective view of one of the hinges and means associated therewith for connecting the holder frame to the casing of the machine.
Figure 5:
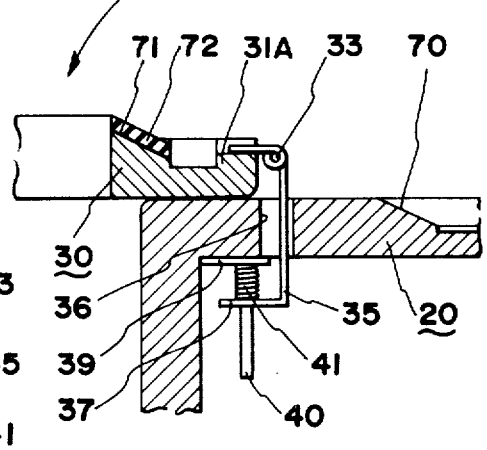
FIG. 5 is an enlarged, fragmentary vertical sectional view somewhat similar to FIG. 2 but showing the holder frame in the open position.

As will be seen also from FIGS. 4 and 5, each hinge 32 comprises leaves 34 and 35 that are joined through the usual knuckles by a pin 33 relatively loosely inserted therein. The hinge leaf 34 is screwed or otherwise fastened to the side member 31A of the holder frame 30. The other hinge leaf 35 projects into the casing 20 by extending downwardly with clearance through an aperture 36 formed in the top of the casing. This hinge leaf terminates in a portion 37 which is bent right-angularly, and a pair of holes 38 are formed through this bent portion 37 to slidably receive respective rods 40 extending downwardly from a plate member 39 screwed to the casing 20. A helical compression spring 41 surrounds each rod 40 and extends between the bent hinge portion 37 and plate member 39. Thus, upon closure of the holder frame 30 over the casing 20 as shown in FIG. 2, the compression springs 41 exert downward pressure on the hinged side of the holder frame. The holder frame 30 is of course openable against the forces of the compression springs 41, as will be seen from FIG. 5.

Figure 6:
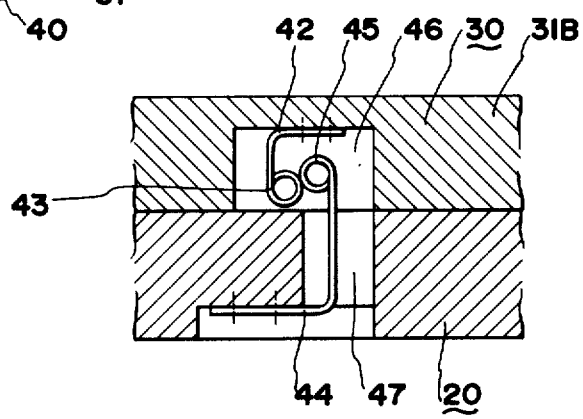
FIG. 6 is an enlarged, fragmentary vertical sectional view of the fastener means for holding the holder frame in the closed position over the casing.

The holder frame 30 has a pair of fastener members 42 on its side member 31B located opposite to the hinged side, and a corresponding pair of fastener members 44 are mounted on the casing 20. As best shown in FIG. 6 the fastener members 42 and 44 are each in the form of a resilient metal strip and have terminal crimps 43 and 45, respectively, that are adapted for resilient engagement with each other upon closure of the holder frame 30 over the casing 20. The fastener members 42 are screwed or otherwise suitably fastened to the holder frame 30 within recesses 46, and the fastener members 44 are likewise fastened to the casing 20 within recesses 47.

It will now be evident that the holder frame 30 when closed over the casing 20 is urged against the latter both by the hinges 32 with their compression springs 41 and by the resilient fastener members 42 and 44. The magnetic sheet placed in position over the platform 27 can therefore be secured to the casing 20 against any possibility of displacement as its marginal edges are caught under pressure between the casing and holder frame.

With particular reference to FIG. 2 the platform 27 on the casing 20 is bounded by bevels 70 declining inwardly from the topmost plane of the casing. Correspondingly the holder frame 30 has inwardly declining bevels 71 of rectangular arrangement for interfitting engagement with the bevels 70 when the holder frame is closed over the casing. For the best results sheets of rubber or like elastic material of constant thickness should be bonded to the bevels 71 to engage frictionally the marginal edge of the magnetic sheet over the platform 27.

When the holder frame 30 is closed over the magnetic sheet on the platform 27, therefore, the major portion of the magnetic sheet is depressed into the sunken platform and is thus subjected to tensile or expensive forces. In this manner the magnetic sheet can be prevented from any undue buckling in spite of the pressure from the magnetic head 100 arranged for abutting contact therewith.

FIG. 8 best illustrates means taken for supporting the magnetic head 100 and yieldably urging the same into abutting contact with the magnetic sheet 200 over the platform 27. The magnetic head is rigidly supported by a support 107 which can be substantially integral therewith and which is slidably or floatingly mounted on a pair of upstanding posts 105 and 106 on the carriage 103. In the showing of FIG. 8 the post 105 is located forwardly with respect to the arrow-marked forward direction of rotation of the turntable 50. A helical compression spring 109 is mounted on this forward post 105 to bias the magnetic head upwardly via the suopport 107.

It may be noted from FIG. 8 that the posts 105 and 106 are pivotally mounted on the carriage 103 as through rivets 105A and 106A respectively. The axes of the posts 105 and 106 are located out of alignment with the axes of the respective rivets 105A AND 106A by distances $\alpha$ and $\beta$. These posts can therefore be manually forced to revolved jointly around the respective rivet axes for fine adjustment of the magnetic head into register with the spiral track on the magnetic sheet.

As may also be noted from FIG. 8, the magnetic head 100 is inclined in the forward direction of rotation of the turntble 50 at a slight angle $\theta$ with respect to the plane normal to the plane of the turntable or of the magnetic sheet thereon. Such forward inclination of the magnetic head should be assured throughout the course of travel of the magnetic head along the radial guide slot 52 from its outermost stating position to the innermost position adjacent the center of the turntable. To this end a spacer 110 is arranged between the turntable bottom 53 and a carriage portion 103A slidably engaging the guide rail 102 which is located rearwardly with respect to the forward direction of rotation of the turntable. The magnetic head is therefore inclined forwardly together with the carriage 103, posts 105 and 106 and so forth relative to the turntable 50.

Figure 9:
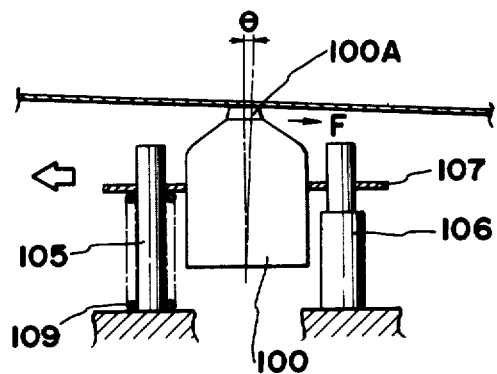
FIG. 9 is a schematic view somewhat similar to FIG. 8 but explanatory of he way the magnetic head is inclined in its forward direction of rotation to compensate for its inevitable rearward inclination caused frictionally as the same moves in sliding contact with the magnetic sheet.

The angle of inclination of the magnetic head 100 may for the best results be from about 1° to 2° with the plane perpendicular to the turntable plane. Thus, as the magnetic head moves in sliding contact with the stationary magnetic sheet by being urged against the same by the compression spring 109 during playback or recording, a reactive force will occur by friction, as indicated by the arrow designated F in FIG. 9. This reactive force will cause the magnetic head, which is resiliently supported as aforesaid, to incline rearwardly so as to offset its preset forward inclination of $\theta$°. As a consequence the magnetic head can be held at right angles with the magnetic sheet when viewed in the radial direction of the turntable or spiral magnetic track as in FIG. 9, so that the gapped contact portion 100A of the magnetic head makes neat sliding contact with the magnetic sheet throughout the course of playback or recording operation.

Figure 7:
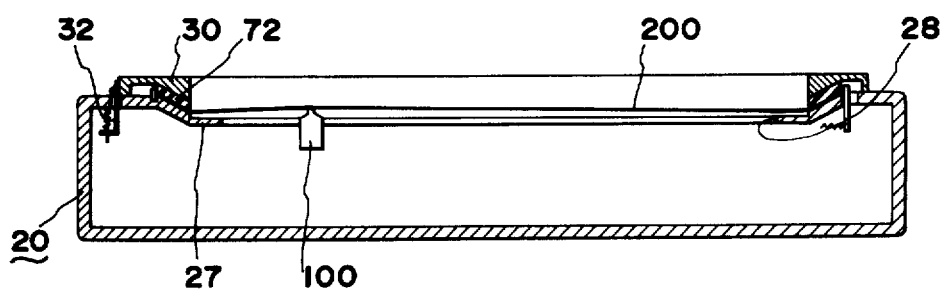
FIG. 7 is a schematic, vertical sectional view explanatory of the way the magnetic head makes abutting contact with magnetic sheet held in position over the casing by the holder frame, in which the various means within the casing are all unshown for the sake of simplicity of illustration.

As set forth previously, the magnetic sheet 200 is secured only at its marginal edges to the casing 20 by the rectangular holder frame 30, so that the major portion of the magnetic sheet has some flexibility even though it is held under tension by the interfitting bevels 70 and 71. As will be seen from a consideration of FIG. 7, therefore, the magnetic sheet inevitably buckles upwardly to some extent under pressure from the spring-actuated magnetic head 100. As the magnetic head travels in the circumferential direction relative to the magnetic sheet, the friction exerted therebetween causes the head to incline rearwardly, However, since this rearward inclination merely offsets the preset forward inclination of the magnetic head, the neat contact between the head and sheet can be assured in spite of the frictional resistance the the buckling of the sheet.

The magnetic head 100 not only revolves around the axis of the turntable but travels along the radial guide slot 52 in the turntable top 51. Another problem arises in connection with this travel of the magnetic head in the radial direction of the turntable. As will be understood from FIGS. 10 and 11, the magnetic sheet secured to the platform 27 in the above described manner is significantly more easy to yield to the pressure from the magnetic head at its central portion than at its peripheral portion.

Figure 11:
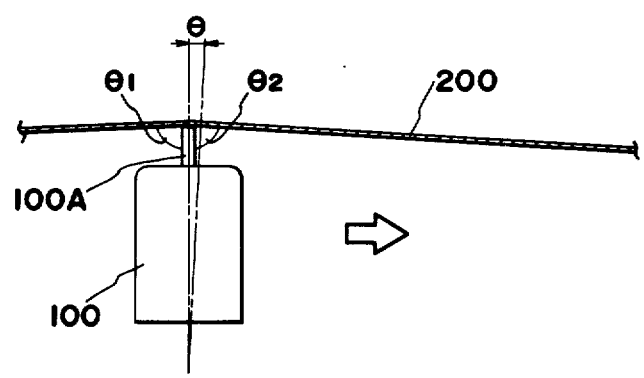
FIG. 11 is a schematic view somewhat similar to FIG. 10 but explanatory of the way the magnetic head is held in neat contact with the magnetic sheet throughout its travel along the complete track on the sheet owing to its radially outward inclination.

If the magnetic head were disposed perpendicular to the plane of the magnetic sheet, as has been the case with the prior art, the angle $\theta 1$ given in FIG. 11 would become considerably less than the angle $\theta 2$ particularly when the magnetic head is located at the outermost starting position. The angles $\theta 1$ and $\theta 2$ are of course measured between the axis of the magnetic head and the magnetic sheet portions on the outside and inside, respectively, of the magnetic, head in the radial direction of the spiral track on the magnetic sheet. This means that the magnetic head is not in neat contact with the magnetic sheet in the radial direction of the spiral track. Moreover, the angles $\theta 1$ and $\theta 2$ vary as the magnetic head travels toward the center of the turntable, so that the reproducing characteristic of the machine is also bound to vary with the progress of the playback operation.

According to this invention, therefore, the magnetic head is inclined radially outwardly by a slight angle $\theta$ with respect to the plane perpendicular to the plane of the magnetic sheet or of the turntable, besides being inclined in its forward direction of rotation. The radially outward inclination of the magnetic head can be realized, for example, by suitably arranging spacers 111, FIG. 10, between the magnetic head and its support 107. This angle of radially outward inclination also ranges most suitably from about 1° to 2°.

Thus, when the magnetic head is located at or adjacent the outermost starting position as represented in FIGS. 10 and 11, the aforesaid angles $\theta 1$ and $\theta 2$ become approximately equal owing to the radially outward inclination of the magnetic head. The magnetic head at or adjacent the starting position is therefore in neat contact with the magnetic sheet buckling upwardly under pressure therefrom. With this inclined attitude unchanged the magnetic head travels toward the center of the turntable as indicated by the arrow in FIGS. 10 and 11. The magnetic sheet at its central portion is so flexible, however, that it adjusts itself to the inclined attitude of the magnetic head to maintain the neat contact therewith. In this manner the inclined magnetic head follows the complete spiral track on the magnetic sheet in neat sliding contact to realize favorable playback quality.

Unlike the prior art where the magnetic sheet is restrained against displacement by a rigid cover plate overlying the complete surface of the sheet, this invention makes it possible for the magnetic sheet to be resiliently supported, so to say, and hence to yield to some extent to the pressure from the magnetic head which is also resiliently supported. Thanks to this arrangement the magnetic head makes more intimate contact with the magnetic sheet than has been possible heretofore. Furthermore, since the magnetic head is inclined both in the forward circumferential direction of rotation of the turntable and in its radially outward direction as above stated, the intimate contact between head and sheet can be maintained throughout the course of playback or recording operation.

FIG. 12 is an illustration of means for automatically positioning the magnetic sheet 200 over the platform 27. The precise placement of the magnetic sheet on the platform is a necessity for the exact registration of the magnetic head 100 with the track 201 on the magnetic sheet. Conventionally this objective has been attained by forming two or more projections on the platform 27 so as to be received in corresponding openings in the magnetic sheet when the latter is placed over the platform. This conventional measure has the disadvantage that the magnetic sheet is easily torn or otherwise damaged as it is repeatedly mounted on and withdrawn from the platform.

The automatic positioning means according to this invention comprises a stop member 80 fixedly mounted on the casing 20 in a central position on one of the shorter sides of the rectangular platform 27, and a pair of spaced stop members 81 and 82 also fixedly mounted thereon on one of the longer sides of the platform. On the other shorter side of the platform there is arranged a positioning member 83 which is slidably accommodated in a recess 85 and which is biased toward the stop member 80 as by a helical compression spring 84. Another positioning member 88 arranged on the other longer side of the platform is likewise slidably accommodated in a recess 87 and is biased toward the pair of stop members 82 and 81 as by a helical compression spring 86.

It will be observed from FIG. 12 that the positioning member 83 is located closer to that side of the platform where the stop members 81 and 82 are arranged, and the positioning member 88 is located closer to that side of the platform where the stop member 80 is arranged. This is to make sure that the platform corner bounded by the stop members 80 to 82 will exactly receive the corresponding corner of the magnetic sheet 200 placed thereon. The force of the compression spring 84 may be made suitably greater than that of the compression spring 86 in order to counterbalance the greater frictional resistance that may be offered by the two stop members 81 and 82 against the sliding movement therealong of the magnetic sheet toward the stop member 80.

The magnetic sheet may first be deposited on the platform 27 so as to cause retreat of the positioning members 83 and 88 against the biases of the compression springs 84 and 86. When released sequentially, the magnetic sheet will be moved by the compression springs 84 and 86 into abutting contact with the stop members 80 to 82. With the magnetic sheet thus readjusted to its precise predetermined position over the platform, the holder frame 30 may be closed over the casing to hold the sheet securely in the manner previously set forth. The magnetic head 100 is of course now in contact with the track on the magnetic sheet in exact registration therewith.

The positioning members 83 and 88 with their compression springs 84 and 86 are each replaceable by a leaf spring 89 shown in FIG. 13. The leaf spring 89 has one of its ends suitably affixed to the inside surface of the casing 20 and the other end 89A projecting upwardly through an opening 90 formed in the casing top. It will be evident that the leaf spring 89 is designed to perform the combined functions of the positioning member 83 or 88 and the compression spring 84 or 86 in the arrangement of FIG. 12.

With the invention thus fully described it is clear that the objects as above stated have been thoroughly accomplished. While a particular embodiment of the invention has been shown and described, however, it is to be understood that changes may be made in the construction and arrangements of the various parts without departing from the scope of the invention as sought to be defined in the following claims.

What is claimed is:

1. In a magnetic sheet player of the type having a casing with a rectangular platform for supporting a magnetic sheet thereon, said magnetic sheet having a spiral magnetic track on one surface which faces said platform, a turntable constituting a part of said platform and rotatable relative to the same, and a magnetic head movable along a radial guide slot in said turntable in step with the rotation thereof to follow the spiral track on the magnetic sheet, the improvement comprising:
a rectangular holder frame means for immovable holding the magnetic sheet over said platform, with the magnetic sheet being caught only at its marginal edges by said holder frame;
means for yieldably urging said magnetic head into abutting contact with the magnetic sheet held by said holder frame over said platform; and
means for holding said magnetic head out of the perpendicular to the plane of the magnetic sheet so that said magnetic head is inclined in the forward direction of rotation of said turntable with respect to the plane normal to the plane of said turntable;
whereby said magnetic head maintains intimate contact with the magnetic sheet throughout its travel along the spiral track thereon.

2. The magnetic sheet player as recited in claim 1, wherein said rectangular holder frame means further comprises:
a holder frame;
hinge means connecting one side of said holder frame to said casing;
spring means for urging said one side of said holder frame against said casing via said hinge means; and
fastener means for releasably fastening the side of said holder frame opposite to said one side to said casing, said fastener means being also effective to urge said opposite side of said holder frame against said casing.

3. The magnetic sheet player as recited in claim 2, wherein said fastener means comprises at least one fastener member affixed to said holder frame, and another fastener member affixed to said casing, said fastener members being both made of resilient strips having terminal crimps capable of interengagement upon closure of said holder frame over said casing.

4. The magnetic sheet player as recited in claim 1, further comprising:
a first set of bevels bounding said platform on said casing, said bevels declining inwardly; and
a second set of bevels formed on said holder frame so as to be in interfitting relationship to said first set of bevels;
whereby the magnetic sheet has its major portion depressed into said platform when said holder frame is closed over said casing.

5. The magnetic sheet player as recited in claim 4, including sheets of elastic material affixed to said second set of bevels, respectively, for frictionally engaging the marginal edges of the magnetic sheet on said platform when said holder frame is closed over said casing.

6. The magnetic sheet player as recited in claim 1, wherein said means for yieldably urging said magnetic head comprises:
a carriage arranged for simultaneous movement with said magnetic head along the radial guide slot in said turntable;
a pair of posts mounted on said carriage, said posts being arranged on the forward and rearward sides, respectively, of said magnetic head with respect to a predetermined forward direction of rotation of said turntable relative to said platform;
a support floatingly mounted on said posts and rigidly supporting said magnetic head for simultaneous movement therewith along said posts; and
spring means urging said magnetic head into abutting contact with the magnetic sheet via said support.

7. The magnetic sheet player as recited in claim 6, wherein said spring means includes a helical spring mounted on the forward one of said posts.

8. The magnetic sheet player as recited in claim 1, wherein said magnetic head is inclined in a predetermined forward direction of rotation of said turntable relative to said platform.

9. The magnetic sheet player as recited in claim 8, wherein the angle of inclination of said magnetic head ranges from about 1° to 2° with respect to a plane normal to the plane of the magnetic sheet.

10. The magnetic sheet player as recited in claim 1, wherein said magnetic head is inclined to the radially outward direction of said turntable.

11. The magnetic sheet player as recited in claim 10, wherein the angle of inclination of said magnetic head ranges from about 1° to 2° with respect to a plane normal to the plane of the magnetic sheet.

12. The magnetic sheet player as recited in claim 1, including positioning means for automatically positioning the magnetic sheet in a pedetermined position on said platform.

13. The magnetic sheet player as recited in claim 12, wherein said positioning means comprises:

a stop member fixedly arranged on each of two adjacent sides of said rectangular platform;

a positioning member arranged on each of the other two adjacent sides of said platform, said positioning members being each movable toward and away from the opposite side of said platform within limits; and spring means urging each said positioning member toward the opposite side of said platform.

14. The magnetic sheet player as recited in claim 12, wherein said positioning means comprises:

a stop member fixedly arranged on each of two adjacent sides of said rectangular platform; and a positioning member arranged on each of the other two adjacent sides of said platform, said positioning members being each in the form of a leaf spring effective to urge the magnetic sheet toward the opposite side of said platform.

* * * * *